United States Patent [19]

MacLeish et al.

[11] 4,115,618

[45] Sep. 19, 1978

[54] NOVEL PROTECTIVE PLASTOMERIC SHEET FOR IDENTIFICATION CARD

[75] Inventors: William T. MacLeish, North Andover; Joseph Shulman, Hyde Park, both of Mass.

[73] Assignee: Polaroid Corporation, Cambridge, Mass.

[21] Appl. No.: 654,220

[22] Filed: Feb. 2, 1976

[51] Int. Cl.[2] .................. B32B 7/06

[52] U.S. Cl. .................. 428/204; 428/206; 428/207; 428/208; 428/346; 428/508; 428/510; 428/520; 96/76 R; 96/77; 156/307; 40/2.2

[58] Field of Search .................. 428/508, 510, 68, 40, 428/204, 203, 520, 346, 206, 207, 208; 96/76 R, 77; 40/2.2

[56] References Cited

U.S. PATENT DOCUMENTS

| | | | |
|---|---|---|---|
| 2,362,580 | 11/1944 | Nadeau et al. | 428/508 |
| 2,760,942 | 8/1956 | Oakley | 428/508 X |
| 2,835,609 | 5/1958 | Starck et al. | 427/359 X |
| 3,391,479 | 7/1968 | Buzzell et al. | 40/2.2 |
| 3,498,788 | 3/1970 | Haas | 96/76 R |
| 3,582,439 | 6/1971 | Thomas | 428/40 X |
| 3,647,442 | 3/1972 | Malster | 96/29 |
| 3,906,135 | 9/1975 | Krutzel | 428/520 X |

*Primary Examiner*—P. C. Ives
*Attorney, Agent, or Firm*—Louis G. Xiarhos

[57] ABSTRACT

A protective plastomeric sheet material for lamination to an image containing layer of a diffusion transfer photographic product.

20 Claims, 2 Drawing Figures

NOVEL PROTECTIVE PLASTOMERIC SHEET FOR IDENTIFICATION CARD

BACKGROUND OF THE INVENTION

1. The Field of the Invention

This invention relates to identification cards (I.D. cards) and more particularly to plastomeric protective materials for such cards.

2. Description of the Prior Art

I. D. cards are by now, well known articles of commerce. Many employ photographs containing information pertaining to the bearer and/or issuer and oftentimes the photographs are color diffusion transfer photographic products. In many instances, the photographs are protected by plastomeric sheet materials which are bonded, through appropriate adhesives, to one surface of the plastomeric protective sheet material. I. D. cards of this type are described in detail in U.S. Pat. Nos. 3,313,052; 3,498,788; 3,511,655; 3,582,439; 3,614,839 and 3,644,116 among others.

In I. D. cards of the type described above, the art especially prefers that a "security seal" be provided between the photograph and the surface of the protective plastic bonded to it. As those in the art know, the achievement of an effective "security seal" is best evidenced by attempts to remove the protective plastomeric sheet material from the photograph. If a security seal exists, all or at least portions of the image containing layer will be removed with the sheet material thereby evidencing the intrusion or attempted intrusion into the card.

A commercially available I. D. card which uses a protective plastomeric sheet material providing a "security seal" between the photograph and material is known in the art as the "PolaPouch" I. D. card. Details relating to elements of a "PolaPouch" I. D. card may be found in referenced U.S. Pat. Nos.3,582,439 and 3,614,839 and especially in the discussions there of the embodiments of FIGS. 2 and 3 of these patents. Essentially, such I. D. cards are prepared by simultaneously photographing a subject and relevant information for the card to provide a developed diffusion transfer I. D. photograph. While moist, the surface of the photograph is laminated to a clear plastomeric sheet material; the sheet material usually employed commercially comprises a cellulose acetate butyrate sheet material having on one surface, a security seal adhesive system comprising a layer of polyvinyl alcohol bonded to the cellulose acetate butyrate material through intermediate layers of cellulose nitrate and cellulose nitrate/hydrolyzed polyvinyl alcohol. Details relating to such cellulose acetate butyrate sheet materials may be found in U.S. Pat. Nos. 2,362,580; 2,541,478 and 2,835,609.

After lamination, the protective plastic material is trimmed to the shape and size of the photograph and then inserted into a polyvinylchloride pouch usually sealed about three edges. After insertion, the remaining open end(s) is sealed to provide the finished I. D. card.

Another commercially available I. D. card which uses a protective plastomeric providing a "security seal" is known in the art as the "Dual Bond" I. D. card. Details relating to a "dual Bond" I. D. card may also be found in U.S. Pat. Nos. 3,582,439 and 3,614,830 and especially in the discussion there of the embodiments of FIGS. 5 and 6. Essentially, "Dual Bond" I. D. cards employ a precut envelope comprising front and back sheet members coupled together along one edge so that the members can be easily separated for insertion of the photograph between them. The back sheet member is usually opaque and has a pressure sensitive adhesive coated on the inside surface. The front sheet member is transparent and comprises the cellulose acetate butyrate sheet material and the security seal adhesive system discussed before. After development and while the surface of the photograph is moist, the diffusion transfer photograph is positioned between the members of the envelope and pressure applied to effect lamination, the wet surface of the photograph being bonded to the polyvinyl alcohol layer carried by the transparent cellulose acetate butyrate sheet material.

It should be understood that in both the "PolaPouch" I. D. card and the "Dual Bond" I. D. card, the primary security feature is the security seal established between the photograph and the protective plastomeric sheet material. Accordingly, it is important that the seal between the surfaces be achieved at the instant of lamination or as shortly thereafter as possible and at least before the assembled card is presented to the intended bearer. With many present commercial I. D. issuance systems, for example, the time between photographing the subject and issuance of the finished card can average about ten minutes or slightly more or less. In the described commercial I. D. issuance systems, the cellulose acetate butyrate protective sheet material described above has successfully provided the desired performance characteristics required by the art especially in terms of the excellent adherent properties of the bond or seal achieved and the time required to achieve it. A large measurwe of this success is due most likely to a distinctive affinity between the particular materials comprising the surface of the photograph containing the image and the above described elements of the security seal adhesive system integrated with the described protective sheet material.

As mentioned, a number of commercial I. D. issuance system employ diffusion transfer film units which provide a color I. D. photograph. The film units so employed are sold by Polarioud Corporation and are designated as Polaroid Land Type 108 film. Essentially, such film units comprise a photosensitive element that can provide an imagewise distribution of diffusible dye-image providing materials after exposure and after distribution of processing composition between the photoexposed element and a superposed image-receiving element. After development, the photosensitive element and image-receiving element are stripped apart and the image is viewed in the image receiving layer of the image receiving element. In Type 108 film, the image receiving layer comprises a mixture of polyvinyl alcohol and poly-4-vinyl pyridine and this layer, when moist, can be bonded to the cellulose acetate butyrate sheet material described before to provide a security seal which corresponds very closely to idealized performance characteristics.

Recently, another diffusion transfer film unit sold by Polaroid Corporation and designated as Polacolor II has become available for use in commercial, instant I. D. issuance systems. Although different dye image providing materials are employed in Type 108 and Polacolor II film, the essential difference between Type 108 and Polacolor II film units insofar as the achievement of a security seal is concerned resides in a difference between the image receiving layers of the films. Like the image receiving layer of Type 108 film, the image receiving layer of Polacolor II also comprises a mixture of polyvinyl alcohol and poly:4-vinylpyridine. However, the image receiving layer of the Polacolor II film additionally comprises a stripping layer formed by coating a solution of ammonia and a hydrophilic colloid (usually gum arabic) on the image receiving layer containing the mixture of polyvinyl alcohol and poly-4-vinylpyridine. Details relating to this overcoated layer can be found in commonly assigned, copending application Ser. No. 584,488 filed June 6, 1975, now U.S. Pat. No. 4,009,031. Although the differences between the image-receiving elements of the described film units is only in the stripping layer, apparently a residue thereof remains after stripping and is sufficient to affect the quality of security seal achieved in bonding the cellulose acetate butyrate protective sheet material of the prior art to Polacolor II diffusion transfer photographs.

The present invention is addressed to the problems discussed above regarding security seals and presents to the art novel, improved plastomeric protective sheet materials which can provide superior security seals for a wider range of diffusion transfer which photographs than can be achieved by the protective materials of the prior art.

SUMMARY OF THE INVENTION

The novel and improved protective plastomeric sheet materials of the present invention comprise a cellulose ester sheet material having one surface hydrolyzed and a security seal providing adhesive which comprises a mixture of a polyvinyl alcohol and a low molecular weight polyvinyl acetate coated on the hydrolyzed surface of the cellulose ester sheet material. The ratio of polyvinyl alcohol to polyvinyl acetate can vary over a rather wide range with ratios of about 3:1 to about 1:3 being suitable and a ratio of about 1:1 being preferred. The novel protective plastomeric sheet materials presented by way of this invention provide excellent security seals when bonded to diffusion transfer photographs having image receiving layers comprising mixtures of polyvinyl alcohols and polyvinylpyridines whether such layers are or are not overcoated with a stripping layer.

DESCRIPTION OF THE PREFERRED EMBODIMENTS

Figure 1:
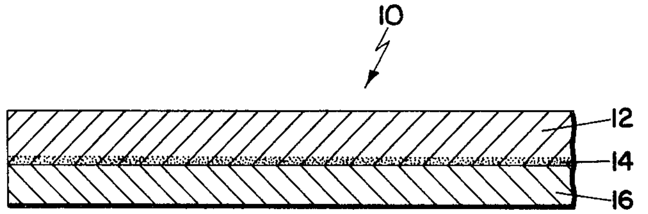
FIG. 1 is a cross-sectional representation of a protective polymeric sheet material of the present invention.

The preferred protective plastomeric sheet materials of the present invention will be better appreciated by reference to FIG. 1. There, sheet material 10, comprises a cellulose ester (or derivative thereof) sheet material 12 and, most preferably a cellulose triacetate sheet material, with one surface 14 hydrolyzed and a coating 16 of a mixture of polyvinyl alcohol and low molecular weight polyvinyl acetate applied to hydrolyzed surface 14. Cellulose triacetate sheet materials are known and commercially available in various thicknesses. The especially preferred cellulose triacetate sheet material of the present invention is a 5 mil cellulose triacetate sheet material available from Eastman Kodak Inc. and designated as Kodacel TA 401.

Methods for hydrolyzing a surface of a cellulosic sheet material are well known to the art and need not be discussed in detail here. However, a suitable method for hydrolyzing the preferred cellulose triacetate sheet material of the present invention involves contacting one surface of a 5 mil sheet material with a solution of sodium hydroxide (about 13% by wt.) for from about 8 to about 12 seconds and at a temperature of about 120° F. or slightly higher.

As mentioned, the preferred adhesive system applied to the hydrolyzed surface of the cellulose triacetate sheet material comprises a 1:1 mixture of a low molecular weight polyvinyl acetate polymer and a hydrolyzed polyvinyl alcohol. As used herein, a "hydrolyzed polyvinyl alcohol" is one produced by hydrolyzing a polyvinyl acetate to convert more than about 85% of the polymeric units to polyvinyl alcohol and most preferably to convert about 99% of the polymeric units to polyvinyl alcoho. Also, as used herein, a "low molecular weight polyvinyl acetate" is one having a molecular weight below that of polyvinyl acetates normally employed in adhesive applications e.g., a molecular weight below about 200,000.

An especially preferred formulation used in coating the adhesive system on the hydrolyzed surface of the cellulose triacetate is as follows:

FORMULATION A

| INGREDIENTS | PARTS BY WEIGHT (SOLID) |
|---|---|
| 1. Daratak-52L (55% solids) | 3.2 |
| 2. Elvanol 90-50 (10% solids) | 3.2 |
| Methanol | 6.6 |
| Water | 87. |
| % solids - 6.4% | |
| Viscosity - 20 sec. - No. 2 Zahn Cup | |

1.Daratak-52L is a low molecular weight polyvinyl acetate sold by W. R. Grace Company 2.Elvanol 90-50 is a hydrolyzed (99% hydrolyzed) polyvinyl alcohol sold by E. I. duPont de Nemours & Co., Inc.

Other formulations useful in the practice of the present inventions are as follows:

FORMULATION B

| INGREDIENTS | PARTS BY WEIGHT |
|---|---|
| Daratak-52L (55% solids) | 6. |
| Elvanol 90-50 (10% solids) | 6. |
| Water | 88. |

FORMULATION C

| INGREDIENTS | PARTS BY WEIGHT |
|---|---|
| Daratak-52L (55% solids) | 6. |
| Elvanol 90-50 (10% solids) | 6. |
| Water | 83. |
| Syloid #620[3] | 5. |

[3]Syloid #620 is a commercially available silica. Sold by W. R. Grace Co. (Davidson Chemical Division).

As can be seen from the above formulations, the essential ingredients of the adhesive system are the hydrolyzed polyvinyl alcohol and the low molecular weight polyvincylacetate. For example, the use of methanol (or similar organic solvent) in Formulation A as a substitute for some of the water speeds drying. Also, the silica is optional and may be employed —preferably in amounts of about 10 parts by weight or less —to provide an improved degree of adhesion. Also, other commerially available hydrolyzed polyvinyl alcohols or low molecular weight polyvinylacetates providing substantially the same performance characteristics of the preferred polymers may be employed in the present invention.

Any of the above Formulations can be coated on the hydrolyzed surface of the cellulose triacetate sheet material in manners well known to the art to provide a coating of adhesive of desired thickness, for example a thickness of about 0.25 mils. It should also be understood that other cellulose esters which can be hydrolyzed to convert one surface to cellulose can be employed in the practice of the present invention as well as the preferred cellulose triacetate and all can be employed as layers on supports or as sheet materials of the esters.

Figure 2:
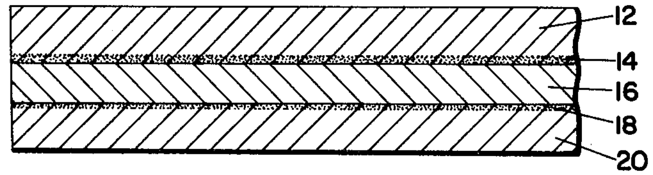
FIG. 2 is a cross-sectional representation of a protective polymeric sheet material bonded to the surface of a diffusion transfer photograph.

The advantages of the novel plastomeric protective materials presented by way of the present invention will be better understood and appreciated by reference to the following Examples which describe the preparation of I. D. products of the type shown in FIG. 2 where the image-bearing surface 18 of an image receiving element 20 of a diffusion transfer photographic product is bonded to sheet material 12 through layer 16. As those in the art know, I. D. diffusion transfer photographic products normally contain—in addition to an image-receiving layer or surface—neutralizing layers, timing layers and support layers but these are not essentially details of the present invention and have not been shown.

EXAMPLE 1

A plastomeric protective sheet of the present invention was prepared by contacting one surface of a cellulose triacetate sheet material (5 mils) with a 13.0% by weight sodium hydroxide solution for about 10 seconds at a temperature of about 120° F. and then drying the sheet material. Formulation A was then coated on the so hydrolyzed surface to provide an adhesive coating when dry of about 0.25 mils thickness.

Polacolor Type 108 Land film was inserted into a camera of a Polaroid ID-3 system. A data card was then inserted and the card and subject were simultaneously photographed to provide a developable image on the photosensitive element of the film. The exposed photosensitive element was then pulled from the camera while in superposition with the image receiving element of the film. After maintaining the elements in superposition for 60 seconds, they were stripped apart. Immediately after stripping, the image-bearing surface of the image receiving element was pressed—while wet and fresh—against the adhesive coating of the plastomeric protective sheet. After about 10 minutes, an attempt was made to separate the protective sheet from the image layer. The image layer, however, adhered firmly to the protective sheet and could not be pulled away without removing the image layer from the image receiving element evidencing the existence of an excellent secruity seal.

EXAMPLE 2

Substantially the same procedure as in Example 1 was followed. However, instead of Type 108 film, Polacolor II film was inserted into a Polaroid ID-3 camera. As mentioned before, the arrangement of components as well as the materials of fabrication involved in the image-receiving element of Polacolor II film are substantially the same as those of the image receiving element of Type 108 film except that the image receiving layer of the Polacolor II film had been overcoated with a solution of ammonia and gum arabic. Again after about 10 minutes, an attempt was made to remove the protective sheet material from the image layer. However, like the image layer of the Type 108 film of Example 1, the image layer of the Polacolor II film strongly adhered to the protective sheet material through the adhesive coating and the surface could not be pulled away from the protective sheet without removing the image and/or image layer from the receiving element.

EXAMPLE 3

A protective plastomeric sheet material of the type presently employed in the art may be prepared as follows. A cellulose acetate butyrate sheet material (5 mils thick) sold under the trade designation of Kodacel TA 401 by Eastman Kodak Inc. is believed to comprise substantially the following arrangement of layers or subcoats on one surface; a layer comprising a mixture of about 90% by weight cellulose nitrate and about 10% hydrolyzed polyvinyl alcohol; a layer comprising a mixture of about 50% by weight cellulose nitrate and about 50% by weight hydrolyzed polyvinyl alcohol and a layer comprising a mixture of about 10% by weight cellulose nitrate and about 90% by weight polyvinyl alcohol with a minor amount of zirconium nitrate. A solution of polyvinyl alcohol was coated over the last mentioned layer or subcoat to provide a layer of polyvinyl alcohol about 0.3 mils thick which is bonded to the cellulose acetate butyrate through the described layers.

Substantially the same procedure was then followed as in Example 1 and an excellent security seal was found to have been achieved between the image layer of the receiving element of the Type 108 film and the cellulose acetate butyrate sheet material through the above-described security seal adhesive system.

EXAMPLE 4

A protective plastomeric sheet material of Example 3 was applied to the moist surface of a freshly processed Polacolor II film in the manner described in Example 2. After 10 minutes, an attempt was made to remove the plastomeric sheet material from the image layer of the Polacolor II film and it was found that the plastomeric sheet material could be removed (slowly and carefully) from the image layer with minimal damage to the layer.

EXAMPLE 5

The procedure of Example 4 was repeated but no attempt was made to remove the protective plastomeric sheet from the image layer until 24 hours after lamination. Again, attempts to remove the sheet material from the image-bearing surface evidenced that the seal obtained between the sheet and image layer was not comparable to that achieved in Examples 1, 2, and 3 even though the seal had been allowed to set for 24 hours.

From the above Examples, it will be seen that the novel plastomeric protective materials of the present invention provide excellent security seals for identification cards having a wider range of effectiveness in such applications than the protective materials known to the art.

Certain modifications may be made in details of the above description of the invention without departing from the spirit and scope of the invention defined in the appended claims. Accordingly, it is intended that all matter contained in the above description or shown in the accompanying drawings be interpreted as illustrative and not in a restrictive sense.

What is claimed is:

1. A protective plastic sheet material comprising a cellulose ester sheet having one surface thereof hydrolyzed and a layer, bonded to said hydrolyzed surface, consisting essentially of a mixture of a hydrolyzed polyvinyl alcohol and a low molecular weight polyvinyl acetate, the ratio of the hydrolyzed polyvinyl alcohol to the polyvinyl acetate being between about 1:3 to about 3:1.

2. A sheet material of claim 1 where the hydrolyzed polyvinyl alcohol is composed of about 99% polyvinyl alcohol.

3. A sheet material of claim 1 where the molecular weight of the polyvinyl acetate is below about 200,000.

4. A sheet material of claim 1 where the ratio of hydrolyzed polyvinyl alcohol to polyvinyl acetate is about 1:1.

5. A sheet material of claim 1 where said cellulose ester is cellulose triacetate.

6. A protective plastomeric sheet material comprising a cellulose triacetate sheet having one surface thereof hydrolyzed and a layer, bonded to said hydrolyzed surface said layer consisting essentially of a mixture of a hydrolyzed polyvinyl alcohol and a polyvinyl acetate having a molecular weight below about 200,000, the ratio of the hydrolyzed polyvinyl alcohol to the polyvinyl acetate being between about 1:3 to about 3:1.

7. A sheet material of claim 6 where the hydrolyzed polyvinyl alcohol is composed of about 99% polyvinyl alcohol.

8. A protective plastomeric sheet material of claim 6 where the ratio is about 1:1.

9. A laminated article which comprises a plastomeric sheet material comprising a cellulose ester sheet having one surface thereof hydrolyzed and a layer, bonded to said hydrolyzed surface, said layer consisting essentially of a mixture of a hydrolyzed polyvinyl alcohol and a low molecular weight polyvinyl acetate having a molecular weight below about 200,000 and where the ratio of the hydrolyzed polyvinyl alcohol to the polyvinyl acetate is between about 1:3 to about 3:1 and a diffusion transfer color image bonded to said layer, said color image being carried in an image-receiving layer comprising a mixture of polyvinyl alcohol and poly-4-vinyl pyridine.

10. An article of claim 9 where the hydrolyzed polyvinyl alcohol is composed of about 99% polyvinyl alcohol.

11. An article of claim 9 where the ratio of the hydrolyzed polyvinyl alcohol to the polyvinyl acetate is about 1:1.

12. An article of claim 9 where said image-receiving is coated with a layer comprising a hydrophilic colloid.

13. An article of claim 12 where the hydrophilic colloid comprises gum arabic.

14. An article of claim 9 where the molecular weight of the polyvinyl acetate is less than about 200,000.

15. An article of claim 9 where said cellulose ester is cellulose triacetate.

16. A laminated article which comprises a protective plastomeric sheet material comprising a cellulose triacetate sheet having one surface thereof hydrolyzed and a layer bonded to said hydrolyzed surface, said layer consisting essentially of a mixture of a hydrolyzed polyvinyl alcohol and a polyvinyl acetate having a molecular weight below about 200,000 with the ratio of the hydrolyzed polyvinyl alcohol to the polyvinyl acetate being between about 1:3 to about 3:1 and a diffusion transfer color image bonded to said layer, said image being carried in an image-receiving layer comprising a mixture of polyvinyl alcohol and a poly-4-vinyl pyridine.

17. An article of claim 1 where the hydrophilic colloid comprises gum arabic.

18. An article of claim 16 where the ratio of the hydrolyzed polyvinyl alcohol to polyvinyl acetate is about 1:1.

19. An article of claim 16 where said image-receiving layer is coated with a layer comprising a hydrophilic colloid.

20. An article of claim 16 where the hydrolyzed polyvinyl alcohol is composed of about 99% polyvinyl alcohol.

* * * * *